Oct. 31, 1967

D. GROOTENBOER 3,350,492

METHOD FOR FORMING UNITARY POLYOLEFIN HINGES

Filed Sept. 18, 1964

INVENTOR:
DIRK GROOTENBOER
BY: Oswald N. Wilmore
HIS ATTORNEY

United States Patent Office 3,350,492
Patented Oct. 31, 1967

3,350,492
METHOD FOR FORMING UNITARY POLYOLEFIN HINGES
Dirk Grootenboer, Delft, Netherlands, assignor to Shell Oil Company, a corporation of Delaware
Filed Sept. 18, 1964, Ser. No. 397,499
Claims priority, application Netherlands, Jan. 27, 1964, 64—0,607
3 Claims. (Cl. 264—320)

ABSTRACT OF THE DISCLOSURE

An improved method of forming unitary hinges from polyolefin by compressing a sheet of polyolefin between a roller and a backing support whereby both the sheet and the roller are at substantially ambient temperature. The roller compresses the sheet to a depth of 90 to 98% of original thickness, thereby forming a hinge web in the sheet having a molecular orientation predominantly transverse to the hinge axis with a thickness 25% or less the original thickness of the sheet.

Background of the invention

This invention relates to a method of fabrication of unitary hinged sections of polyolefin sheet material and more particularly to cold-forming unitary hinged structures of polyolefin materials having the molecular orientation transverse to the hinge axis.

The mechanical flexing properties of polyolefin materials, polypropylene and polyethylene, have been widely used in the fabrication of hinges or flexing members because of a reasonably good bending-fatigue endurance. It is known that the bending-fatigue endurance of these polyolefin materials can be improved if the molecular orientation of the monomers is perpendicular to or transverse to the axis of flex. In fact, when such molecular orientation exists, it is possible to form hinges having exceptional bend-fatigue endurance. Since unitary polyolefin hinges or hinged sections with molecular orientation have a phenomenal bending-fatigue endurance a wide interest has developed in methods for obtaining the desired molecular orientation. It is known that when polyolefin sheet material is flat rolled between rollers, molecular orientation tends to align with the direction of the rolling and the material so rolled increases in length but shows very little width expansion. Of course such a rolling process is not adaptable to the many different and variously shaped structures that are fabricated from polyolefins and such a technique is expensive and time consuming.

When articles are made of polyolefins, as by molding or extrusion, the molecular orientation is a random distribution of the molecular chains. Likewise, when previously molded polyolefins are hot-stamped the molecular orientation remains generally in a random distribution. This is also true in injection-molded hinges where a small web is formed between the connected parts movable relative to one another.

In all hot-stamping, extrusion and injection where flexing webs are formed, it is important that the web contours be well rounded and that the web thickness be critically maintained. Whether the hinge is made by hot-stamping, by extrusion or is molded at the same time the article is fabricated or even machined, it has been known that if the temperature of the material is raised to approximately 106° C. or higher and the hinge is flexed while hot, the webbed portion between the web-connected swingable parts will stretch and achieve a molecular orientation transverse of the flexing axis in the web area. However, such a step is undesirable in production lines and imposes great restrictions thereon.

The importance of molecular orientation can be demonstrated by the following table in which hinge members formed of polypropylene strips ⅛ inch thick and ½ inch wide were flexed between a temperature of 106° C. and 170° C. approximately 100 times before they were tested. Both flexed and non-flexed hinges (oriented and unoriented respectively) were used for the test.

TABLE 1.—STRENGTH OF POLYPROPYLENE TENSILE BARS WITH CREASED HINGES (ORIENTED) AND BARS WITHOUT CREASED HINGES

| Test, Unit | ASTM Method | Oriented | Unoriented |
|---|---|---|---|
| Tensile impact strength, ft.-lb./sq. in. Izod impact strength, ft.-lb./sq. in. notch | D1822 | 185 | 98 |
| Tensile strength at yield, p.s.i. | D256 D638 | 3.81 7,900 | 0.53 4,980 |

It can be seen that the overall characteristics of the hinges with molecular orientations are far superior to those of non-oriented hinges.

In the past, hinges have been stamped in a cold propylene sheet material utilizing only the pressure of the cold die. However, they have not proved to be very satisfactory. A hinge which has been made in this way often breaks when flexed in the direction which closes the groove in the hinge because the plastic of the bending of the web portion is stretched beyond its elastic limit and breaks. In such cases examination usually reveals two distinct layers of plastics in the hinge web. Because of the poor quality of hinges formed by previous cold forming processes, i.e., those formed at ambient temperature, they have had little commercial value.

Summary of the invention

It is an object of the present invention to provide a process whereby polypropylene hinges can be formed in polyolefin sheet material at ambient temperatures which have a bending-endurance as good as those formed by hot-flexing at temperatures well above ambient.

It is also an object of the present invention to provide a quick, easy, convenient method of fabricating high quality unitary hinges of polyolefin sheet materials at ambient temperatures.

These and other objects of the invention will become apparent from the description and the accompanying illustration.

In its broadest aspect the method according to this invention is characterized by a cold-forming process in which a rolling disk under pressure is forced into polyolefin sheet material supported on a non-elastic base and rolled along the desired hinge line to form a thin web portion between adjacent sections of the sheet material. The disk may be rolled along the hinge line once or a number of times and it is important that the web portion has an area of minimum thickness which is not greater than 25% of the original sheet thickness. The hinge web so produced has been flexed more than three million times without fracturing.

In order to reduce the central portion of the web section down to 25% or less of the original thickness of the polyolefin sheet, the rolling disk must be pressed into the sheet a depth of 90 to 98% of the original thickness because of the elasticity of the polyolefin material. It is probably the deep penetration of the rolling disk which causes the molecular orientation along the hinge web formed by the rolling disk to predominately orient transversely to the hinge axis. This is contrary to the normal experience of rolling polyolefin sheet material since it is well known that the molecular orientation tends to orient parallel to the direction of roll, which is not the case in the instant invention.

In unitary polyolefin hinges formed according to this invention, the bending-fatigue endurance is excellent. For example, such a hinge can be flexed more than three million times without failure. Further, shrinkage and warpage are non-existent and the hinges formed according to this invention have well rounded edges which give them good tear resistance in the area of the hinge web.

One of the most important features in the instant invention is that it lends itself well to mass production fabrication since it forms hinges which are of equal or superior strength to those formed by the well known hot-flexing processes whereby the web must be flexed while hot to achieve the desired molecular orientation. It is obvious that hot-flexing the web portion of the hinge is cumbersome in fabrication techniques.

The invention can be more easily understood by reference to the accompanying drawing and will be described with reference thereto.

Description of the preferred embodiments

Figure 1:
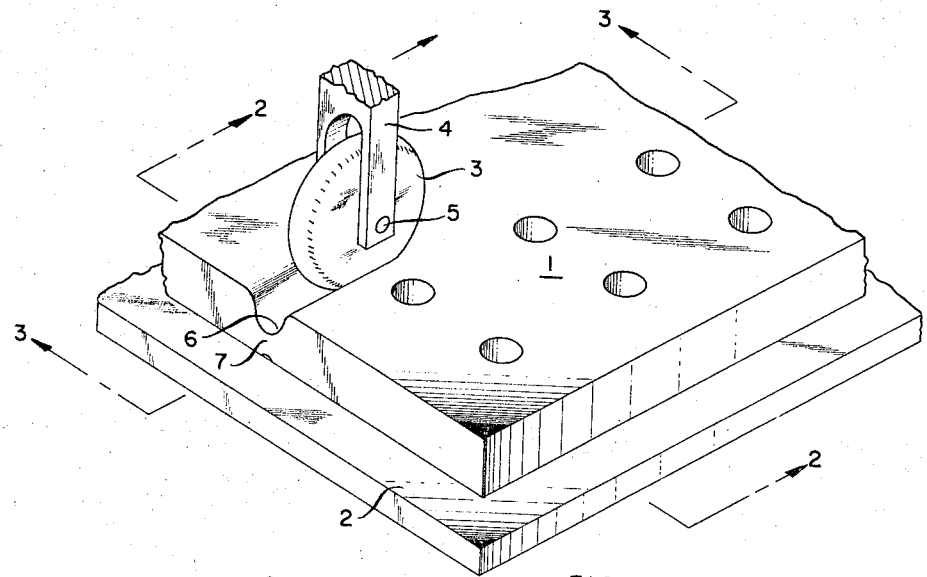
FIGURE 1 is a top perspective showing the method of cold-forming a unitary polyolefin hinge with parts broken away.

A simple embodiment for carrying out the instant invention is shown in FIGURE 1 in which a polyolefin sheet 1 is supported on a non-elastic backing plate 2 and a rounded-edge rolling disk 3 is used to effect compression of the polyolefin between the disk and the non-elastic support 2. Rolling disk 3 which has a rounded periphery is forced into the polyolefin sheet by a pressure mechanism (not shown) above the bifurcated structure 4 supporting the disk between its forks on axle 5. In practicing the process the polyolefin sheet 1 is placed on the non-elastic backing support 2 and the pressure mechanism through the fork and axle forces the disk into the sheet material; than a carrier assembly (not shown) rolls the rolling disk 3 along the desired hinge line thereby forming a web 6 connecting the two portions of the polyolefin sheet material on either side of the hinge line. In order to reduce the minimum web thickness to 25% or less original thickness of the sheet material 1, it is necessary to press the rolling disk 3 into the sheet a depth of 90 to 98% of the original thickness of the sheet because of the elastic quality of the polyolefin material. Also this deep penetration of the sheet material by the rolling disk is necessary to achieve the desired molecular orientation. One, two or more passes of the rolling disk across the sheet and along the hinge line may be used if the desired web thickness is not achieved by the initial pass of the rolling disk 3.

Figure 2:
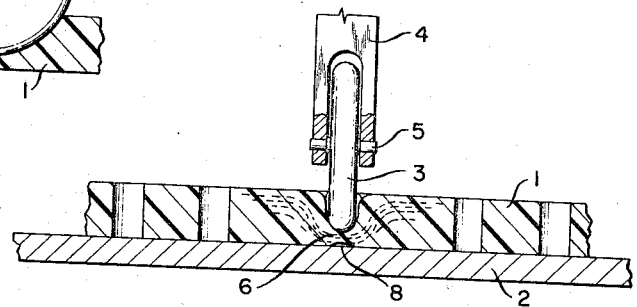
FIGURE 2 is a vertical section along line 2—2 of FIGURE 1 with broken lines in the web section showing the predominate molecular orientation transverse to the bending axis.

In FIGURE 2 the molecular orientation of the polyolefin hinge web is indicated by the broken lines. It shows that the general molecular orientation effected by the passage of rolling disk 3 is transversed to the hinge line or axis which is the quality that gives a superior hinge.

Figure 3:
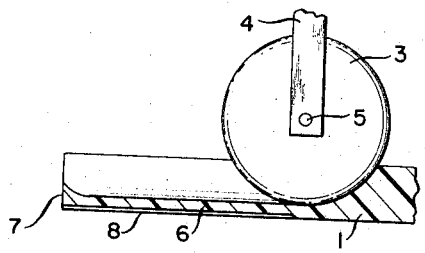
FIGURE 3 is a vertical section along line 3—3 of FIGURE 1 with parts broken away.

One of the advantages of the instant process is that the hinge will have well rounded surfaces and edges adjacent to the web which improves its tear resistance. Referring to FIGURE 3 it can be seen that a small fillet 7 can be left at the terminal ends of the web to improve tear resistance.

Figure 4:
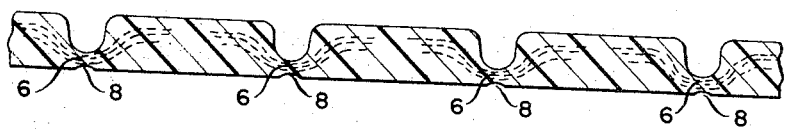
FIGURE 4 is a vertical section through a polyolefin sheet having a plurality of hinged sections connected by hinge webs formed by the method of this invention.

If it is desired to make a number of parallel hinges, they can be simultaneously formed by a number of juxtaposed rolling disks pressed down into the sheet and rolled across the sheet along the parallel hinge lines to form a plurality of webs between adjacent sheet sections as can be seen in FIGURE 4. Directly beneath the rolling disk on the opposite side of the sheet material 1, in the embodiments of both FIGURES 2 and 4, there is formed a small depression 8 due to a slight stretching of the web transverse to the hinge line.

More specifically, the compression of the sheet material 1 under the rolling disk 3 effects an elongated thin webbed section 6 along the desired flexing axis which serves as the hinge. Because of the deep penetration of the rolling disk there is a slight displacement of the material transversely to the hinge line which effects a fairly uniform unidirectional molecular orientation transverse to the hinge axis, i.e., across the web portion. Since this rather surprising molecular orientation is achieved at ambient temperatures, for example, 25° C., it is far below the softening point of the sheet material and the molecular orientation and the quality of the hinge web so formed are maintained after the operation has been completed.

Obviously, the method can be accomplished using various apparatus and only a very simple device has been illustrated in the drawings. For example, a pair of fixed rollers one disk-shaped and one flat could replace rolling disk 3 and the non-elastic backing plate 2, respectively. Other methods for accomplishing the method of the invention will be apparent to those skilled in the art and it should be appreciated that accurate adjustments of the clearance between the disk and the support are important to prevent severing the sheet material into several parts and to avoid a non-uniform web structure. This is particularly critical in view of the deep penetration of the rolling disk of from 90 to 98% of the original sheet thickness.

Through this unique cold-forming process for forming unitary polyolefin hinges, a large measure of freedom in the direction and positioning of hinges is possible without the sacrifice of hinge quality. Further, no limitations are placed on the production line processes such as required by the hot-flexing technique and the cold-forming process is generally carried out at ambient temperature but some deviation is allowable as long as the temperature does not exceed 50° C. A very useful range for carrying out this process lies between 15° and 25° C. That is, the polyolefin sheet material should preferably be maintained at a temperature from approximately 15° C. to 50° C. during the formation of the hinge web.

While various polyolefin sheet materials can be used, for the practice of this invention, polyethylene and polypropylene are preferred. Polypropylene usually forms a superior hinge according to this cold-forming process.

I claim as my invention:

1. An improved method of forming unitary hinges from polyolefin sheet material having a molecular orientation predominantly transverse to the hinge axis which comprises the steps of:
   (1) supporting polyolefin sheet material at ambient temperature on a substantially rigid backing support;
   (2) compressing said sheet material between said backing support and the periphery of a roller having a rounded periphery and having its rolling axis parallel to the plane of said sheet material; and,
   (3) rolling said roller about its rolling axis while at approximately the temperature of the sheet material and at the same time maintaining said sheet material compressed between said disk and said support from approximately 90% to 98% of its original thickness along a desired hinge line for a time sufficient to form a hinge web having a thickness of approximately 25% or less of the original thickness of said sheet material, whereby the molecular orientation of the hinge is predominantly transverse to the hinge axis.

2. An improved method of forming unitary hinges from polyolefin sheet material having molecular orientation predominantly transverse to the hinge axis which comprises the steps of:
   (1) supporting polyolefin sheet material at a temperature from approximately 15° C. to 50° C. on a substantially rigid backing support;

(2) compressing the sheet material between the support and the periphery of a roller having a rounded periphery and having its rolling axis parallel to the plane of the sheet material;

(3) rolling the roller about its rolling axis while maintaining the sheet material compressed between the roller and the support from approximately 90% to 98% of its original thickness along a desired hinge line for a time sufficient to form a hinge web having a thickness of approximately 25% or less the original thickness of the sheet material whereby the molecular orientation of the hinge is predominantly transverse to the hinge axis; and (4) maintaining the sheet material at the approximately 15° C. to 50° C. temperature while the roller is being rolled about its roller axis.

3. The method according to claim 2 in which the step of supporting the polyolefin sheet material includes supporting a sheet of polypropylene material.

References Cited

UNITED STATES PATENTS

| | | |
|---|---|---|
| 1,337,254 | 4/1920 | Muench. |
| 3,019,486 | 2/1962 | Stinson. |
| 3,066,366 | 12/1962 | Wyckoff _____ 18—10 |
| 3,083,410 | 4/1963 | McGlamery _____ 264—280 |
| 3,205,289 | 9/1965 | Carpenter. |

OTHER REFERENCES

Spencer Chemical Co. Pamphlet. The Integral Hinge "Poly-Pro" Propylene, received in office July 1963; pp, 1 to 4, class 264–339.

ROBERT F. WHITE, *Primary Examiner.*

R. R. KUCIA, *Assistant Examiner.*